US012770748B2

(12) United States Patent
Jones et al.

(10) Patent No.: US 12,770,748 B2
(45) Date of Patent: Oct. 20, 2026

(54) ABLATION CHAMBER ASSEMBLIES, LINERS, AND ASSOCIATED COMPONENTS AND METHODS

(71) Applicant: Battelle Energy Alliance, LLC, Idaho Falls, ID (US)

(72) Inventors: Matthew M. Jones, Idaho Falls, ID (US); Nick H. Erfurth, Idaho Falls, ID (US); Joey A. Charboneau, Blackfoot, ID (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 281 days.

(21) Appl. No.: 18/421,897

(22) Filed: Jan. 24, 2024

(65) Prior Publication Data

US 2024/0274308 A1 Aug. 15, 2024

Related U.S. Application Data

(60) Provisional application No. 63/481,438, filed on Jan. 25, 2023.

(51) Int. Cl.
*G21C 17/06* (2006.01)
*G01N 1/02* (2006.01)
*G01N 1/04* (2006.01)

(52) U.S. Cl.
CPC ............... *G21C 17/06* (2013.01); *G01N 1/02* (2013.01); *G01N 2001/045* (2013.01)

(58) Field of Classification Search
CPC ... G21C 17/06; G01N 1/02; G01N 2001/0045
See application file for complete search history.

(56) References Cited

U.S. PATENT DOCUMENTS 6,734,401 B2 * 5/2004 Bedingham ............... B03C 1/30 219/628
8,586,943 B2 * 11/2013 Verbeck, IV ............ G01N 1/42 250/282

(Continued)

FOREIGN PATENT DOCUMENTS

CN 102184832 B * 7/2012
JP 4180434 B2 * 11/2008

OTHER PUBLICATIONS

English translation of JP-4180434-B2, from iq.ip.com.*
English translation of CN-102184832-B, from iq.ip.com.*

*Primary Examiner* — Kristina M Deherrera
*Assistant Examiner* — Jean F Morello
(74) *Attorney, Agent, or Firm* — TraskBritt

(57) ABSTRACT

An ablation chamber assembly, comprising a chamber, a support structure, and a liner. The chamber may have a fluid inlet, a central cavity, and a fluid outlet. The support structure may be disposed in the interior cavity and include a support flange and a fluid passageway defined through the support structure. The liner may be disposed in the chamber over the support flange of the support structure. The liner may include a central opening and one or more sample chambers spaced about the central opening. The one or more sample chambers may be configured to receive testing samples. The support structure fluid passageway may be configured to direct a fluid from the fluid inlet into one sample chamber of the one or more sample chambers through the central opening of the liner and out the fluid outlet.

20 Claims, 15 Drawing Sheets

(56) References Cited

U.S. PATENT DOCUMENTS

| | | | | |
|---|---|---|---|---|
| 9,207,165 | B2 * | 12/2015 | Zhang ................ | G01N 21/0332 |
| 10,319,576 | B2 | 6/2019 | Gunther et al. | |
| 2014/0268134 | A1 * | 9/2014 | O'Connor ............ | G01N 21/718<br>356/318 |

* cited by examiner

ABLATION CHAMBER ASSEMBLIES, LINERS, AND ASSOCIATED COMPONENTS AND METHODS

CROSS-REFERENCE TO RELATED APPLICATION

This application claims the benefit under 35 U.S.C. § 119(e) of U.S. Provisional Patent Application Ser. No. 63/481,438, filed Jan. 25, 2023, the disclosure of which is hereby incorporated herein in its entirety by this reference.

STATEMENT REGARDING FEDERALLY SPONSORED RESEARCH OR DEVELOPMENT

This invention was made with government support under Contract Number DE-AC07-05-ID14517 awarded by the United States Department of Energy. The government has certain rights in the invention.

TECHNICAL FIELD

The disclosure relates generally to ablation devices and related components and methods. More particularly, the disclosure relates to ablation chambers and liners and associated components and methods.

BACKGROUND

Conventional ablation chambers being utilized for laser ablation of nuclear-based samples lack the ability to perform multi-sample analyses without cross contaminating the chamber or requiring new chambers after each analysis. This is to ensure results are not skewed by loading different sample types (i.e., different fuel types) and for safety reasons due to buildup of contamination within the chamber. Conventional ablation chambers for nuclear samples are also expensive to replace and are only able to house one sample.

SUMMARY

An embodiment of the disclosure includes an ablation chamber assembly including a chamber, a support structure, a liner, a central opening, and one or more chambers spaced about the central opening. The chamber defines a fluid inlet, a central cavity, and a fluid outlet. The support structure is disposed in the central cavity, the support structure including a support flange and a fluid passageway defined through the support structure. The liner is disposed in the chamber over the support flange of the support structure. The liner includes a central opening and one or more sample chambers spaced about the central aperture, the one or more sample chambers configured to receive testing samples. The fluid passageway is configured to direct a fluid from the fluid inlet into one sample chamber of the one or more sample chambers through the central opening of the liner and out the fluid outlet.

Another embodiment of the disclosure includes a liner for an ablation device, the liner including a central opening, one or more sample chambers angularly spaced about the central opening, an inlet, and an outlet. The one or more sample chambers are each configured to receive testing samples. The inlet defines a fluid passageway between the central opening and each of the one or more sample chambers. The outlet defines a fluid passageway between each of the one or more sample chambers and an outer surface of the liner.

Another embodiment of the disclosure includes a method of analyzing a fuel sample including receiving a liner within a central cavity of a chamber, the liner having at least two sample chambers, each sample chamber including a substance to be analyzed. The liner is rotated until a first sample chamber of the at least two sample chambers is in a testing position, and at least one analysis of the substance to be analyzed is performed in the testing position. The method also includes rotating the liner until a second sample chamber of the at least two sample chambers is in the testing position and performing at least one analysis of the substance to be analyzed in the second sample chamber in the testing position.

DETAILED DESCRIPTION

Figure 1:
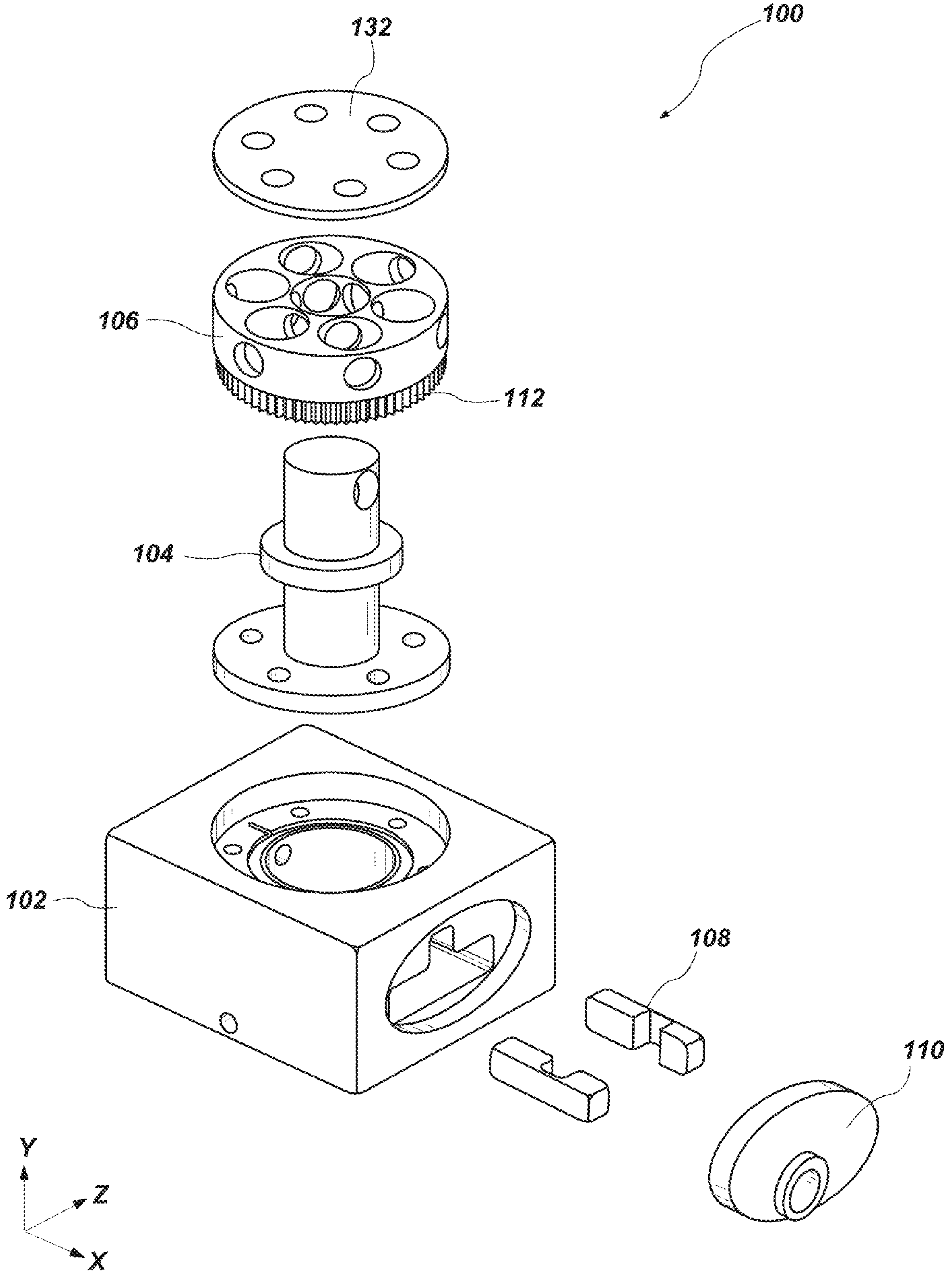
FIG. 1 is an exploded view of a housing assembly in accordance with embodiments of this disclosure.

In the brief summary above and in the detailed description, the claims, and in the accompanying drawings, reference is made to particular features (including method acts) of the disclosure. It is to be understood that the disclosure includes all possible combinations of such features. For example, where a particular feature is disclosed in the context of a particular embodiment, or a particular claim, that feature can also be used, to the extent possible, in combination with and/or in the context of other aspects and embodiments described herein.

The following description provides specific details, such as components, assembly, and materials to provide a thorough description of embodiments of the disclosure. However, a person of ordinary skill in the art will understand that the embodiments of the disclosure may be practiced without employing these specific details.

The use of the term "for example," means that the related description is explanatory, and though the scope of the disclosure is intended to encompass the examples and legal equivalents, the use of such terms is not intended to limit the scope of an embodiment or this disclosure to the specified components, acts, features, functions, or the like.

Drawings presented herein are for illustrative purposes, and are not necessarily meant to be actual views of any particular material, component, structure, or device. Thus, embodiments described herein are not to be construed as being limited to the particular shapes or regions as illustrated, but include deviations in shapes that result, for example, from manufacturing. For example, a region illustrated or described as box-shaped may have rough and/or nonlinear features, and a region illustrated or described as round may include some rough and/or linear features. Moreover, sharp angles that are illustrated may be rounded, and vice versa. Thus, the regions illustrated in the figures are schematic in nature, and their shapes are not intended to illustrate the precise shape of a region and do not limit the scope of the present claims. The drawings are not necessarily to scale. Additionally, elements common between figures may retain the same numerical designation.

As used herein, the term "configured to" in reference to a structure or device intended to perform some function refers to size, shape, material composition, material distribution, orientation, and/or arrangement, etc., of the referenced structure or device.

As used herein, the terms "comprising" and "including," and grammatical equivalents thereof are inclusive or open-ended terms that do not exclude additional, unrecited elements or method acts, but also include the more restrictive terms such as "consisting of" and "consisting essentially of" and grammatical equivalents thereof.

As used herein, the term "may" with respect to a material, structure, feature, or method act indicates that such is contemplated for use in implementation of an embodiment of the disclosure and such term is used in preference to the more restrictive term "is" so as to avoid any implication that other, compatible materials, structures, features and methods usable in combination therewith should or must be excluded.

As used herein, the singular forms "a," "an," and "the" include the plural forms as well, unless the context clearly indicates otherwise.

As used herein, the term "and/or" includes any and all combinations of one or more of the associated listed items.

As used herein, relational terms, such as "first," "second," etc., are used for clarity and convenience in understanding the disclosure and accompanying drawings and does not connote or depend on any specific preference, orientation, or order, except where the context clearly indicates otherwise.

As used herein, the term "about," when used in reference to a numerical value for a particular parameter, is inclusive of the numerical value and a degree of variance from the numerical value that one of ordinary skill in the art would understand is within acceptable tolerances for the particular parameter. For example, "about," in reference to a numerical value, may include additional numerical values within a range of from 90.0 percent to 110.0 percent of the numerical value, such as within a range of from 95.0 percent to 105.0 percent of the numerical value, within a range of from 97.5 percent to 102.5 percent of the numerical value, within a range of from 99.0 percent to 101.0 percent of the numerical value, within a range of from 99.5 percent to 100.5 percent of the numerical value, or within a range of from 99.9 percent to 100.1 percent of the numerical value.

As used herein, the term "substantially" in reference to a given parameter, property, or condition means and includes to a degree that one of ordinary skill in the art would understand that the given parameter, property, or condition is met with a degree of variance, such as within acceptable tolerances. By way of example, depending on the particular parameter, property, or condition that is substantially met, the parameter, property, or condition may be at least 90.0 percent met, at least 95.0 percent met, at least 99.0 percent met, at least 99.9 percent met, or even 100.0 percent met.

While embodiments of this disclosure have been described and illustrated herein with respect to specific ablation devices, those of ordinary skill in the art will recognize and appreciate that features and elements from different embodiments may be combined to arrive at further, additional ablation devices and methods as contemplated by the inventors.

Figure 2:
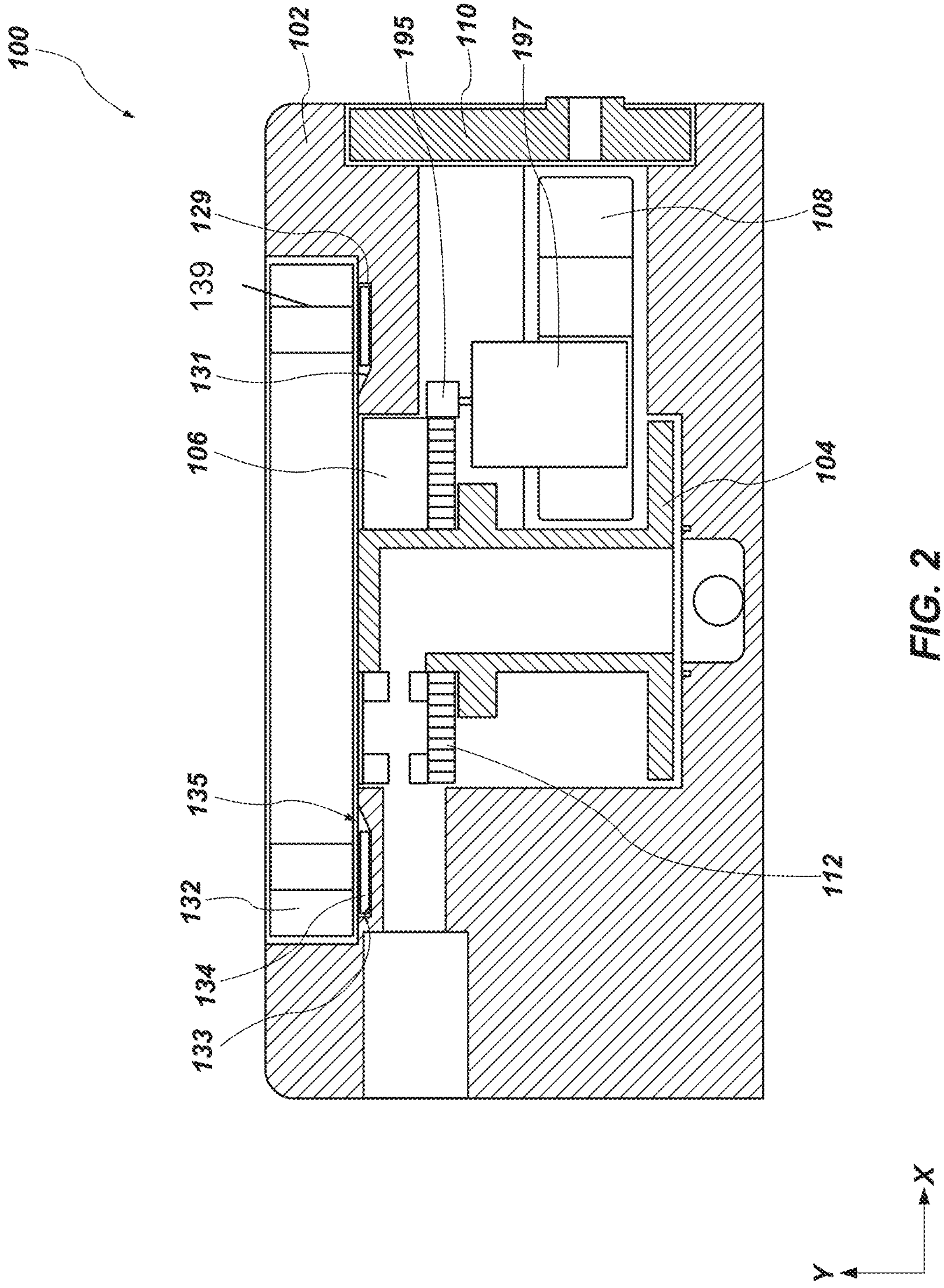
FIG. 2 is an elevational cross section of the housing of FIG. 1.

FIG. 1 shows an exploded view of a housing assembly 100 (e.g., ablation chamber assembly) and FIG. 2 illustrates a cross-sectional view of the housing assembly 100. The housing assembly 100 includes a chamber 102, a support structure 104, a liner 106, a tray 108, a tray cover 110, a gear 112, and a cover 132. The chamber 102 is configured to receive the support structure 104, the liner 106, the tray 108, the tray cover 110, the gear 112, and the cover 132. FIG. 2 shows the housing assembly 100 in a fully assembled state. When in the fully assembled state, the housing assembly 100 may be configured to fit onto a testing area of an ablation device. The overall dimensions of the housing assembly (i.e., height, length, width, etc.) may be determined by the size and/or specifications of the testing area (e.g., table, platform, etc.) of an associated ablation device (e.g., laser ablation device). In some embodiments, the outer major dimensions (e.g., height, width, length, diameter, apothem, etc.) of the housing assembly 100 are within a range from about 2 inches in the X, Y and Z directions to about 6 inches in the X, Y, and Z directions. However, in other embodiments, the housing assembly 100 may have any size or shape that is compatible with any ablation or other testing device.

Figure 3:
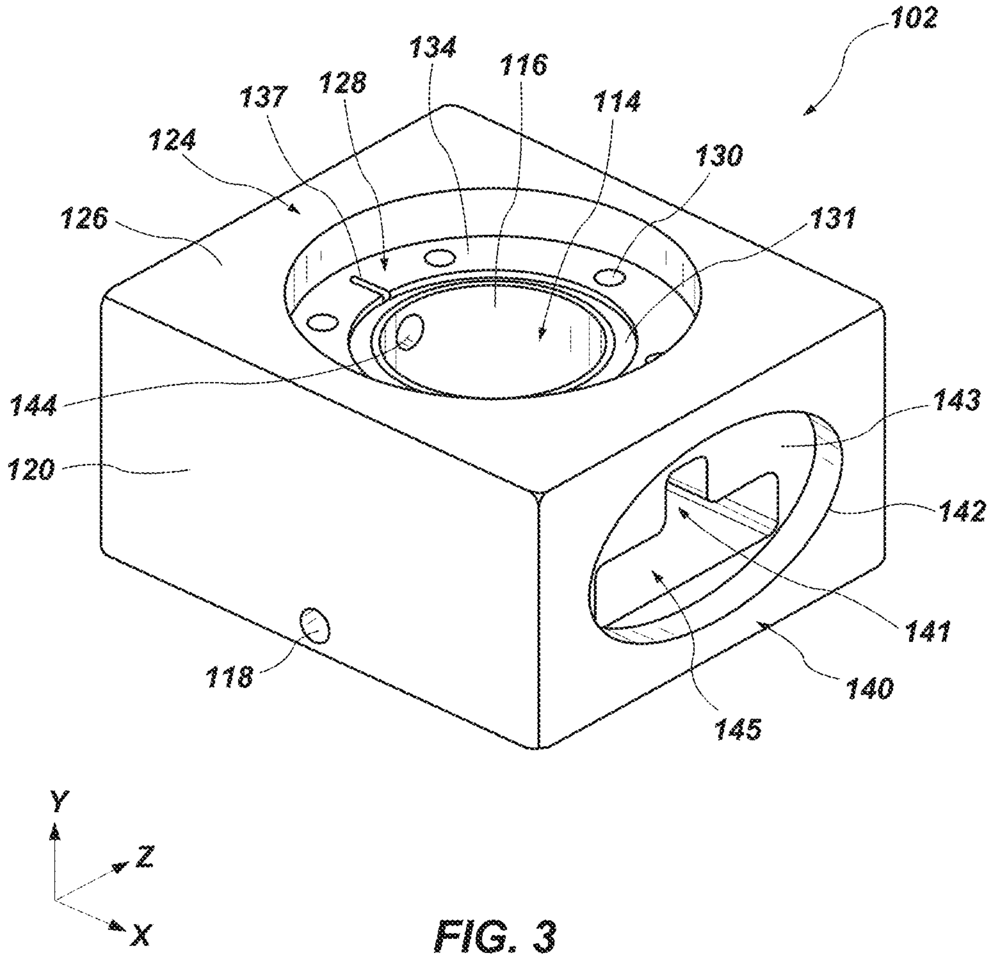
FIG. 3 is a perspective view of the chamber of FIG. 1.
Figure 4:
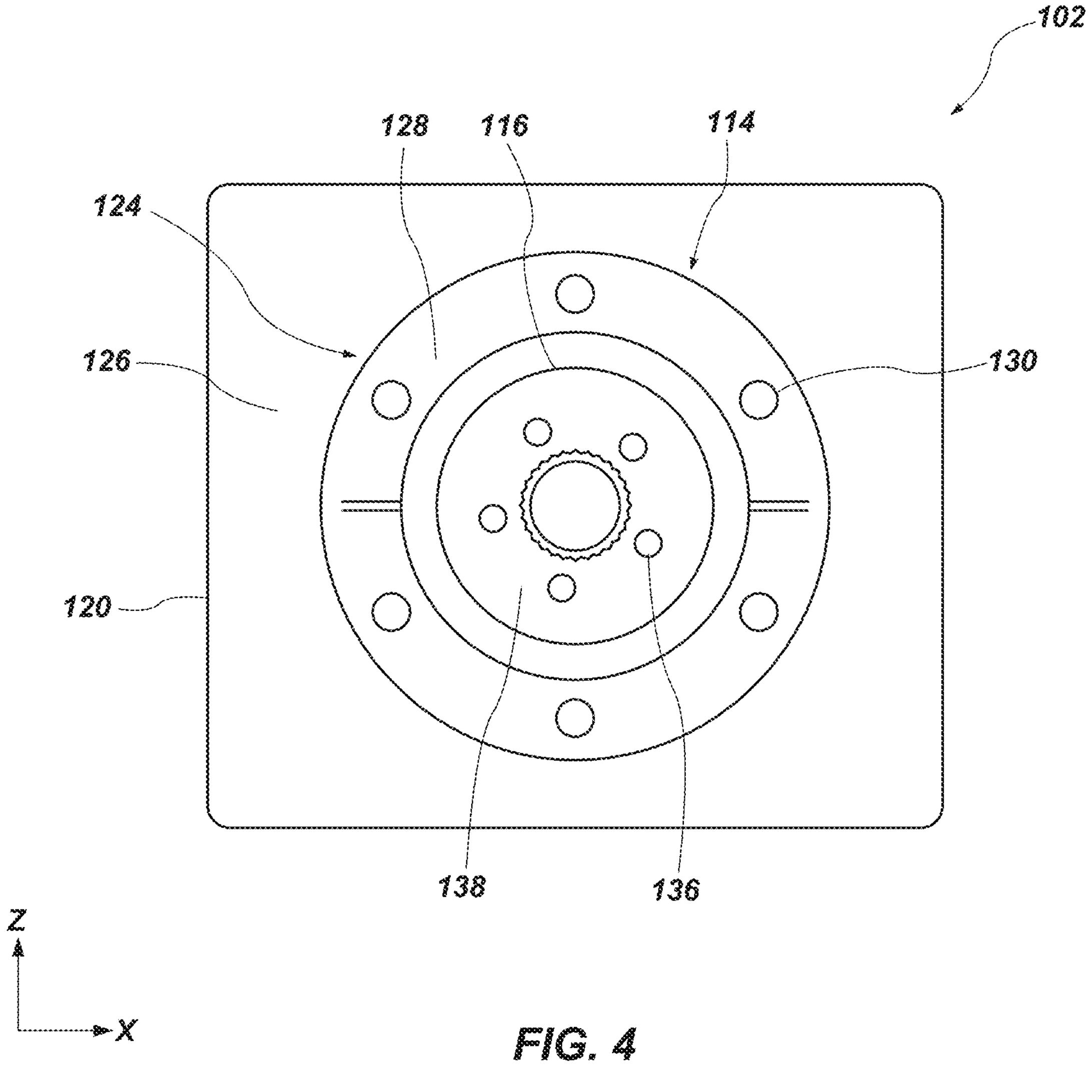
FIG. 4 is a top view of the chamber of FIG. 3.
Figure 5:
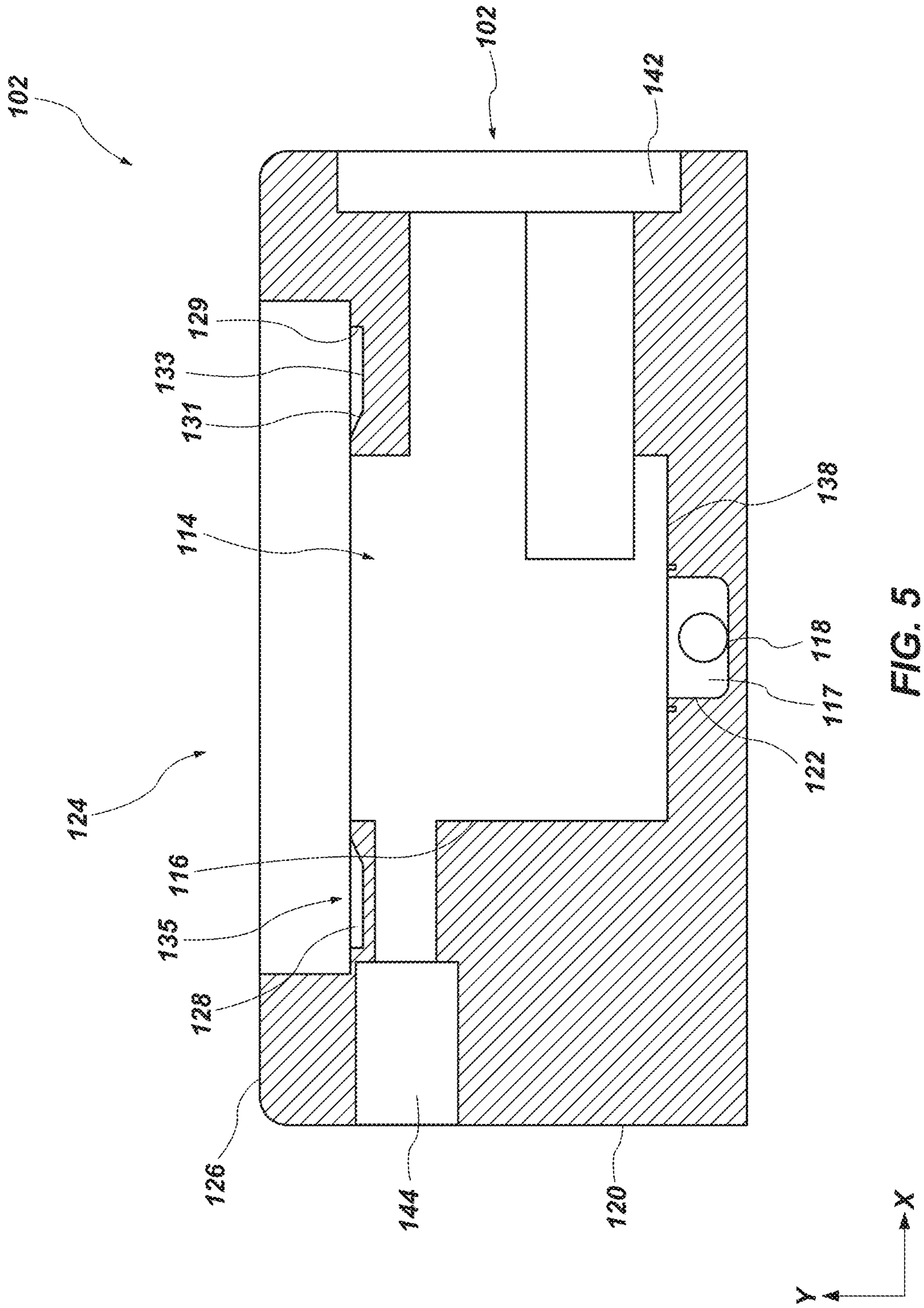
FIG. 5 is an elevational, cross sectional view of the chamber of FIG. 3.

FIGS. 3-5 show various views of the chamber 102. The chamber 102 may include a central cavity 114 defined by an inner wall 116. The inner wall 116 may exhibit any shape complementary to at least one of the support structure 104 (shown in detail in FIGS. 6-8) and the liner 106 (shown in detail in FIGS. 9-18). In some embodiments the inner wall 116 exhibits a substantially circular shape. In other embodiments, the inner wall 116 may exhibit a substantially rectangular shape, octagonal shape, triangular shape, among others, which are configured to support and contain the support structure 104 (FIGS. 1 and 2), while facilitating rotation of the liner 106 (FIGS. 1 and 2). In some embodiments, the inner wall 116 may exhibit different shapes in different regions. For example, the inner wall 116 may exhibit a circular shape in a region where the inner wall 116 interfaces with the liner 106 (FIGS. 1 and 2) and a rectangular or other shape in a lower region of the central cavity 114, such that the inner wall 116 may form a seal with the liner 106 (FIGS. 1 and 2) and provide additional support of the liner 106 (FIGS. 1 and 2) in conjunction with the support structure 104 (FIGS. 1 and 2), while facilitating rotation of the liner 106 (FIGS. 1 and 2). The central cavity 114 may at least partially define a fluid passageway 117 through the chamber 102. An inlet 118 may be in fluid communication with the central cavity 114. While inlet 118 is shown in FIG. 3 at a specific location, the inlet 118 may be disposed through an outer side surface 120 of the chamber 102 on any side of the chamber 102. The inlet 118 may be configured to receive a fluid, such as a gas or a liquid from a source and deliver it to the central cavity 114 through a channel 122. The channel 122 may extend from the inlet 118 to the central cavity 114. The inlet 118, the central cavity 114, and the channel 122 may partially form the fluid passageway 117 of the chamber 102. The central cavity 114 may receive and secure the support structure 104 (FIGS. 1 and 2) relative to the chamber 102, and the channel 122 may couple the fluid passageway 160 in the support structure 104 to the inlet 118.

A first opening 124 may be defined in a first surface 126 of the chamber 102. The first opening 124 may be configured to at least partially receive the support structure 104, the liner 106, and the gear 112. The first opening 124 may include a step 128 having an inner and an outer major dimension (e.g., diameter, radius, width, apothem, etc.). The inner major dimension of the step 128 may be substantially the same as a major dimension of the central cavity 114, such that the step 128 defines the central cavity 114. The outer major dimension of the step may be substantially the same as the outer major dimension of the first opening 124. The step 128 may also include a plurality of hardware interfaces 130 (e.g., studs, holes, threaded holes, threaded bosses, etc.). The plurality of hardware interfaces 130 may be configured to receive fasteners (e.g., bolts, screws, nuts, etc.). The fasteners may be configured to engage with a plurality of complementary hardware interfaces 139 in the cover 132 to secure the cover 132 (shown in FIGS. 1 and 2) over the first opening 124, creating a seal at the step 128. In some embodiments, there may be a gasket 134 (FIG. 2) configured to be placed between the step 128 and the cover 132 (FIGS. 1 and 2). The gasket 134 (FIG. 2) may aid in sealing the central cavity 114 from the outside environment.

The step 128 may also include a recess 135. The recess 135 may be configured to at least partially receive the gasket 134. The recess 135 may have an outer major dimension that is substantially the same as, or smaller than, the outer major dimension of the first opening 124. The recess 135 may be defined by an outer wall 129, a bottom surface 133, and an inner wall 131. The outer wall 129 may define an outer major dimension of the recess 135, the bottom surface 133 defines a depth of the recess 135, and the inner wall 131 may define an inner major dimension of the recess 135. At least one of the inner wall 131 and the outer wall 129 may be a tapered wall (e.g., may extend at an angle between about 90° and about 180° from the bottom surface 133). For example, in the embodiments illustrated in FIG. 2, the inner wall 131 is a tapered wall extending from the bottom surface 133 at an angle in a range from about 120° to about 150°. In some embodiments, the other of the inner wall 131 and the outer wall 129 is also a tapered wall extending at an angle relative to the bottom surface 133 of the recess 135. The angle of the other of the inner wall 131 and the outer wall 129 may be substantially equal and opposite the angle of the opposing inner wall 131 and outer wall 129. In other embodiments, the other of the inner wall 131 and the outer wall 129 may be substantially perpendicular to the bottom surface 133 (e.g., may extend from the bottom surface 133 at a substantially 90° angle). For example, in the embodiment illustrated in FIG. 2, the recess 135 is defined by an outer wall 129 that extends perpendicularly from the bottom surface 133 and a tapered inner wall 131 that extends from the bottom surface 133 at an angle in a range from about 120° to about 150°.

The recess 135 may be sized and shaped such that when the cover 132 is secured to the chamber 102, the gasket 134 is compressed between the cover 132 and a bottom surface 133 of the recess 135. The compression of the gasket 134 between the cover 132 and the bottom surface 133 of the recess 135 may create a seal between the cover 132 and the bottom surface 133 of the recess. The seal may be configured to substantially prevent fluid ingress or egress between the central cavity 114 and the first opening 124. In some embodiments, the shape of the recess 135 is selected to facilitate the formation of the seal. For example, in the embodiments illustrated in FIG. 2, the gasket 134 may be compressed against the bottom surface 133 of the recess 135 at least due to a depth of the recess 135 being less than a thickness of the uncompressed gasket 134. Furthermore, as the gasket 134 is compressed, the gasket 134 may expand radially outward until the gasket 134 contacts the perpendicular outer wall 129, such that the gasket 134 may form a second seal between the gasket 134 and the outer wall 129. The tapered inner wall 131 may facilitate any further expansion of the gasket 134, such as fluctuations in expansion caused by thermal expansion and to accommodate slight differences in gasket sizes, such as due to manufacturing tolerances. The gasket 134 may include a slot 137. The slot 137 may extend partially from the inner major dimension to the outer major dimension of the gasket 134. The slot 137 may be configured to facilitate thermal expansion of the gasket 134 while maintaining the seal between the cover 132 and the chamber 102.

The cover 132 (FIGS. 1 and 2) is configured to facilitate at least a portion of radiation from a laser to pass therethrough into the central cavity 114 during use of the housing assembly 100. In some embodiments, the cover 132 is formed as a single unitary structure from a single material. The material composition of the cover 132 may include at least one material that is configured to facilitate at least a portion of the radiation from the laser to pass through the cover 132, at any position, without substantially affecting the power output of the laser. The cover 132 at least partially includes a fused silica material. The material composition and functional characteristics of the cover 132 may depend upon the wavelength of the radiation from the laser passing through the cover 132. Different methods may be used to form the cover 132 out of fused silica. Controlling and/or changing the method of forming the cover 132 out of fused silica may change the resulting properties of the cover 132 based upon the wavelength of the radiation from the laser. The material of the cover 132 may be substantially resistant to conditions to which it is exposed during use and operation of the housing assembly 100. Additionally, a first hardware connection 136 may be located on a bottom surface 138 of the cavity 114. The bottom surface 138 may partially define the central cavity 114. The first hardware connection 136 may be hardware connections configured to secure the support structure 104 in the central cavity 114. The first hardware connection 136 may be any hardware connection such as screws, bolts, clips, pins, etc.

A second opening 140 may be located on the outer side surface 120. The second opening 140 may be configured to partially receive the tray 108 and the tray cover 110 (FIGS. 1 and 2). The second opening may have a first surface 142 that may be configured to be complementary to, and at least partially receive, the tray cover 110 (FIGS. 1 and 2). The second opening 140 may have a second surface 143. The second surface 143 may define a portion of the opening 140 configured to receive the tray 108 and/or a motor 197 (FIG. 2) and not the tray cover 110. The portion of the opening 140 defined by the second surface 143 may be substantially complementary to the shape of the tray 108 and the motor 197 in the Y-Z plane and may substantially fix the orientation of the tray 108 and the motor 197 relative to the chamber 102 in a fully assembled state. For example, the portion of the opening 140 in the second surface 143 may include a lower portion 145 having a shape substantially complementary to the tray 108 and an upper portion 141 having a shape substantially complementary to an upper portion of the motor 197. For example, the portion of the opening 140 in the second surface 143 may be configured to receive the tray 108 and the lower portion of the motor 197 secured to the tray 108 into the lower portion 145 of the opening 140 and to receive the upper portion of the motor 197 that extends away from the tray 108 in the upper portion 141 of the opening 140. In some embodiments, the portion of the opening 140 defined by the second surface 143 may exhibit a substantially complementary shape to only the motor 197 in the Y-Z plane and may eliminate the tray 108. When the chamber 102 is in an at least partially or fully assembled state, the tray cover 110 (FIGS. 1 and 2) may create a seal with the first surface 142 to seal the second opening 140. In some embodiments, the seal may be created by welding. In other embodiments, the seal may be created by using fasteners, gaskets, etc.

An outlet 144 may extend from the central cavity 114 through the outer side surface 120. The outlet 144 may be in fluid communication with the central cavity 114 and at least partially define the fluid passageway through the chamber 102.

Fluid passageways may exist in the support structure 104 (FIGS. 1 and 2) and the liner 106 (FIGS. 1 and 2) that may substantially align with a fluid passageway in the chamber 102 when the housing assembly 100 is in a fully assembled state as shown in FIG. 2. When the housing assembly 100 is fully assembled, a fluid passageway may begin at the inlet 118, continue through the channel 122, pass from the chamber 102 into the support structure 104 (FIG. 2), pass internally through the fluid passageway of the support structure 104 (FIG. 2) into the fluid passageway of the liner 106 (FIG. 2) and finally pass through the outlet 144 of the chamber 102.

The chamber 102 may include any materials that are rigid and configured to shield an external environment from any byproducts that may be produced during the ablation process. In some embodiments, the chamber 102 is configured to shield byproducts associated with the analysis of radioactive materials. For example, the chamber 102 may be formed from one or more metals having radiation shielding or reflecting properties, such as stainless steel, lead, tin, antimony, tungsten, bismuth, etc. In some embodiments, the chamber 102 comprises stainless steel.

Figure 6:
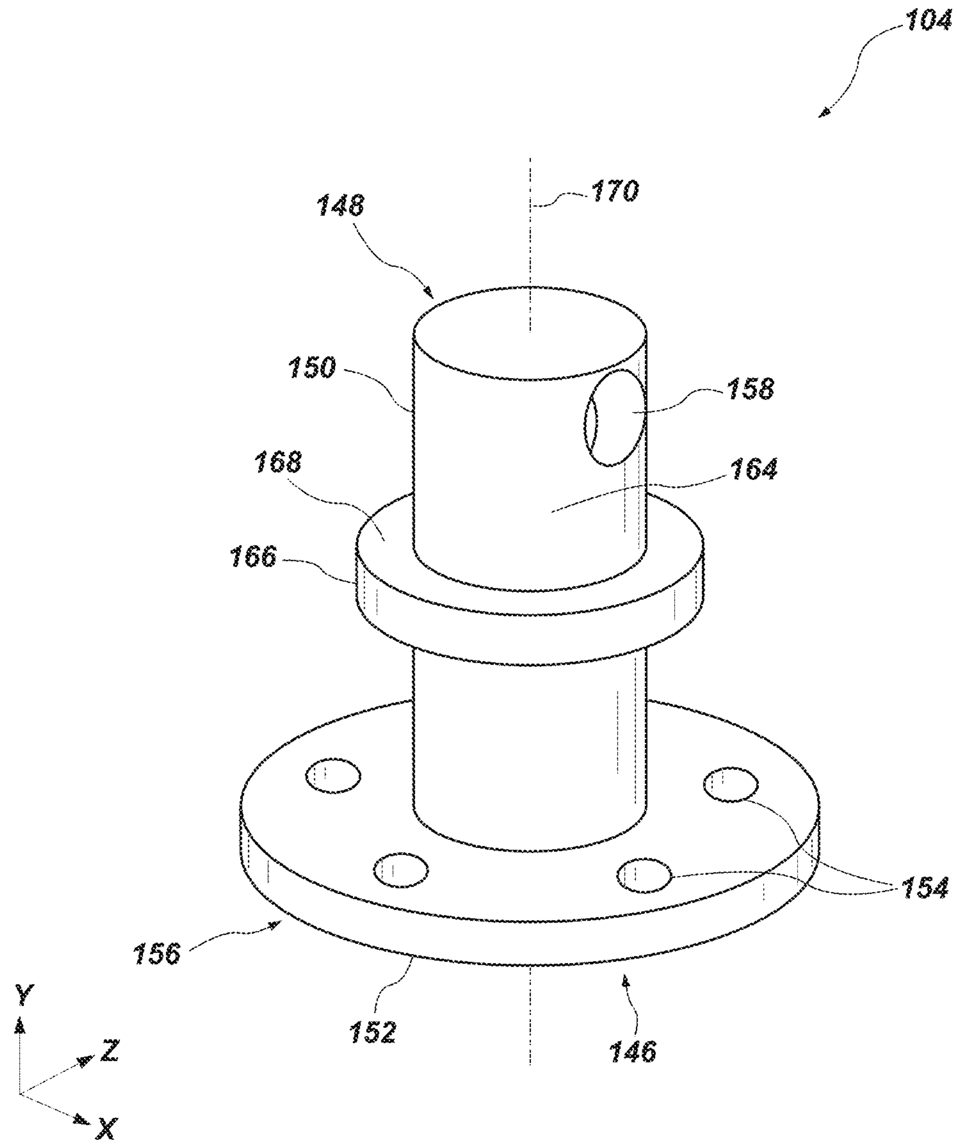
FIG. 6 is a perspective view of the support structure of FIG. 1.
Figure 7:
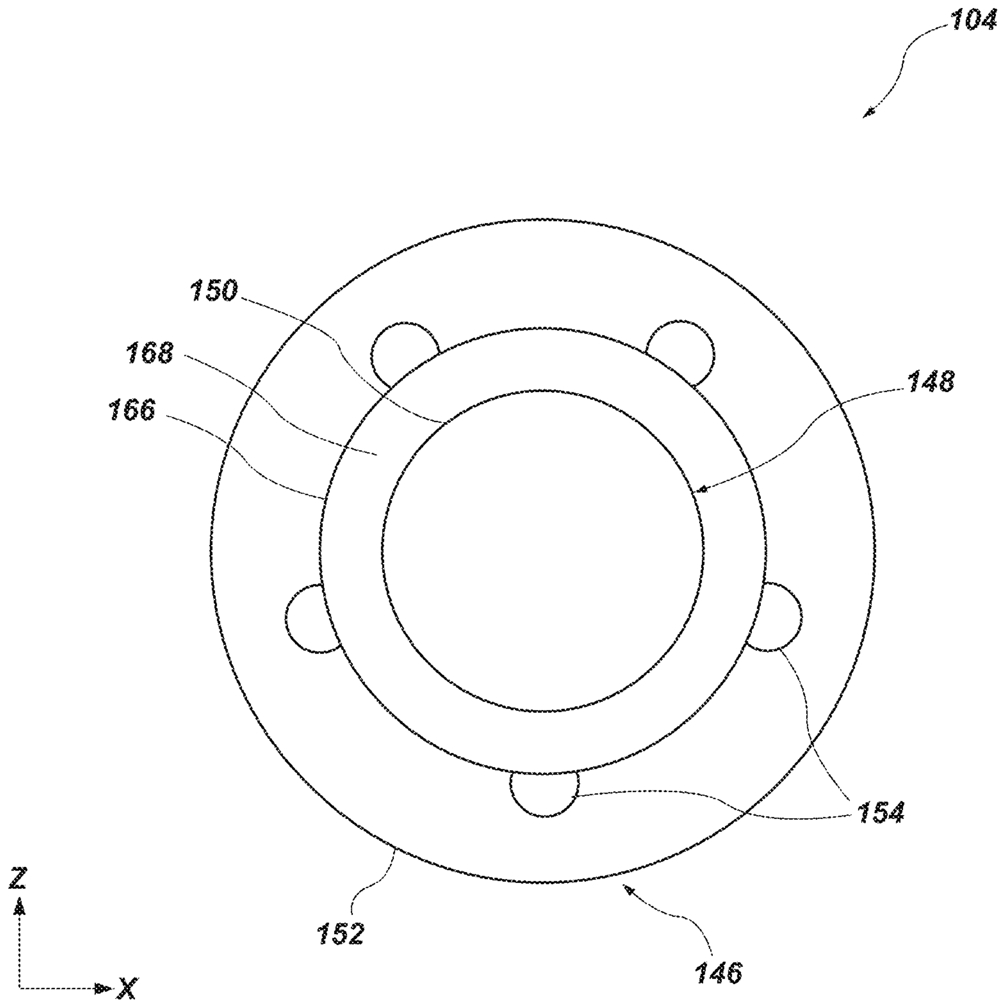
FIG. 7 is a top view of the support structure of FIG. 6.
Figure 8:
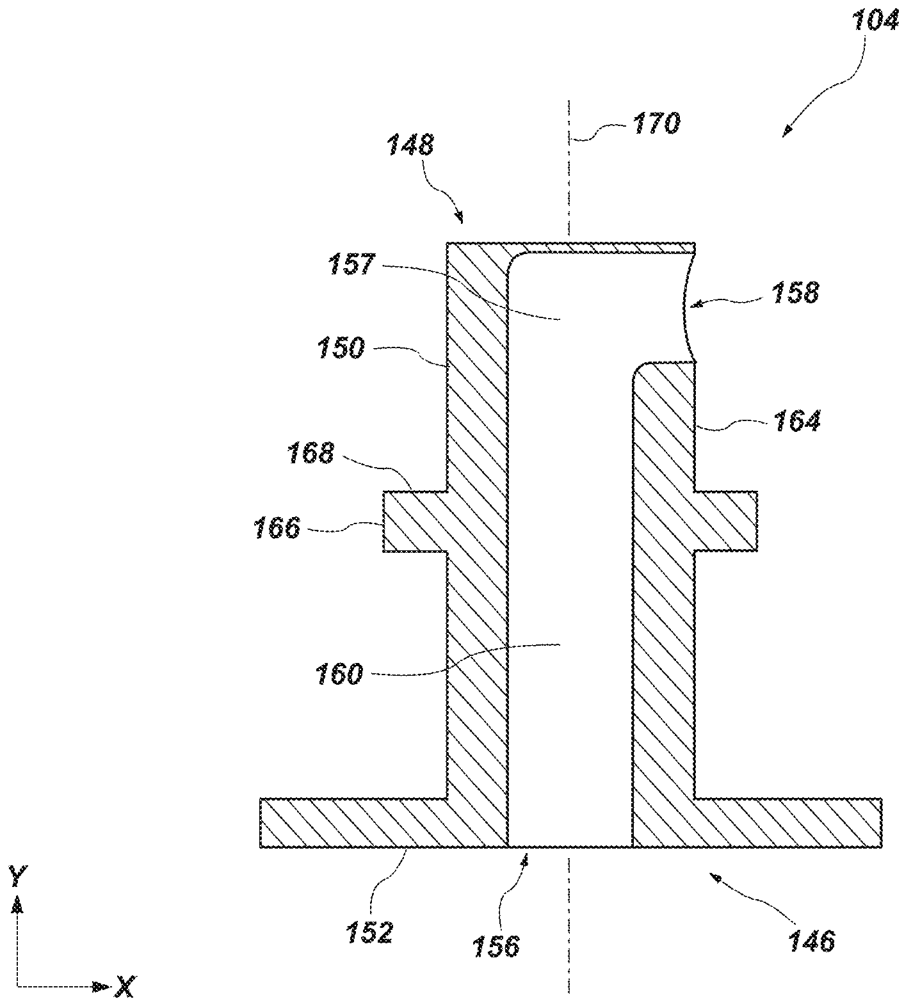
FIG. 8 is an elevational, cross sectional view of the support structure of FIG. 6.

Referring to FIGS. 6-8, the support structure 104 may include a first end 146 and a second end 148 opposite the first end 146. A shaft 150 may extend from the first end 146 to the second end 148. The support structure 104 may exhibit a substantially cylindrical shape. The first end 146 may include a flange 152. The flange 152 may have a larger major dimension than the shaft 150. The flange 152 may also include a second hardware connection 154. The second hardware connection 154 may be configured to substantially align with the first hardware connection 136 in the chamber 102 to secure the support structure 104 and the chamber 102 together when the housing assembly 100 is in a fully assembled state. The second hardware connection 154 may be any hardware connection such as screws, bolts, clips, pins, etc. In some embodiments, the flange 152 may have a non-circular shape (e.g., rectangular, triangular, octagonal, etc.) that is complementary with a non-circular shape of at least a portion of the cavity 114 (FIG. 2) of the chamber 102 (FIG. 2). The non-circular shape may rotationally secure the support structure 104 relative to the chamber 102 (FIG. 2), providing additional support to the hardware connections 136, 154.

The support structure 104 may also include a fluid passageway 160 extending through the shaft 150. An inlet 156 may be defined by the first end 146 and at least partially define the fluid passageway 160 through the support structure 104. An outlet 158 may be defined by the second end 148 and at least partially define the fluid passageway 160 through the support structure 104. The fluid passageway 160 may connect the inlet 156 and the outlet 158 through the support structure. The outlet 158 may be located on an outer surface 164 of the shaft 150. When the housing assembly 100 (FIGS. 1 and 2) is in a fully assembled state, the fluid passageway 160 of the support structure 104 may substantially align with the fluid passageway of the chamber 102 (FIGS. 1 and 2) and at least partially define an overall fluid passageway of the housing assembly 100 (FIGS. 1 and 2). For example, the inlet 156 may align with the channel 122 (FIG. 5) and the fluid passageway 160 may extend axially through the support structure 104. The fluid passageway 160 may then connect to the outlet 158, which may extend radially from the fluid passageway 160. The outlet 158 may be radially aligned with the outlet 144 (FIG. 5) defined in the chamber 102 (FIGS. 1, 2, and 5). The fluid passageway 160 may be configured to change a flow direction of fluid flowing through the fluid passageway. For example, in the embodiments illustrated in FIG. 8, the fluid passageway 160 includes an elbow 157 configured to change a direction of the flow from an axial direction at the inlet 156 to a radial direction at the outlet 158.

The support structure may also include a second flange 166. The second flange 166 may extend circumferentially around the shaft 150 and extend away from the outer surface 164. The second flange 166 may include a surface 168 that is configured to receive the gear 112 (FIGS. 1 and 2) and the liner 106 (FIGS. 1 and 2). When the housing assembly 100 is in a fully assembled state, the gear 112 (FIGS. 1 and 2) may rest upon the second flange 166, the second flange 166 creating a mechanical interference to prevent the gear 112 (FIGS. 1 and 2) and the liner 106 (FIGS. 1 and 2) from moving in an axial direction relative to the shaft 150. The second flange 166 may also be configured to facilitate rotation of the gear 112 (FIGS. 1 and 2) and the liner 106 (FIGS. 1 and 2) about a longitudinal axis 170.

The support structure 104 may include any suitable material such as one or more metals (e.g., stainless steel, titanium, aluminum, metal alloys, etc.), glasses (e.g., soda-lime, borosilicate, fiberglass, aluminosilicate, non-silicate, etc.), ceramics (e.g., quartz, aluminum oxide, clay, porcelain, etc.), and/or composites (e.g., metal matrix composites, ceramic matrix composites, etc.).

Figure 10:
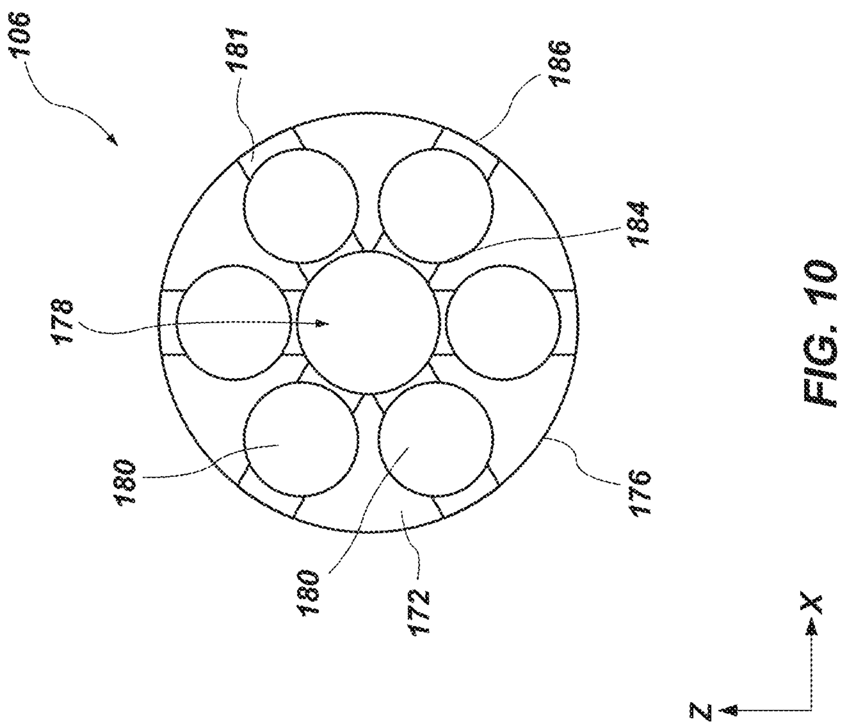
FIG. 10 is a top, cross sectional view of the liner of FIG. 9.
Figure 9:
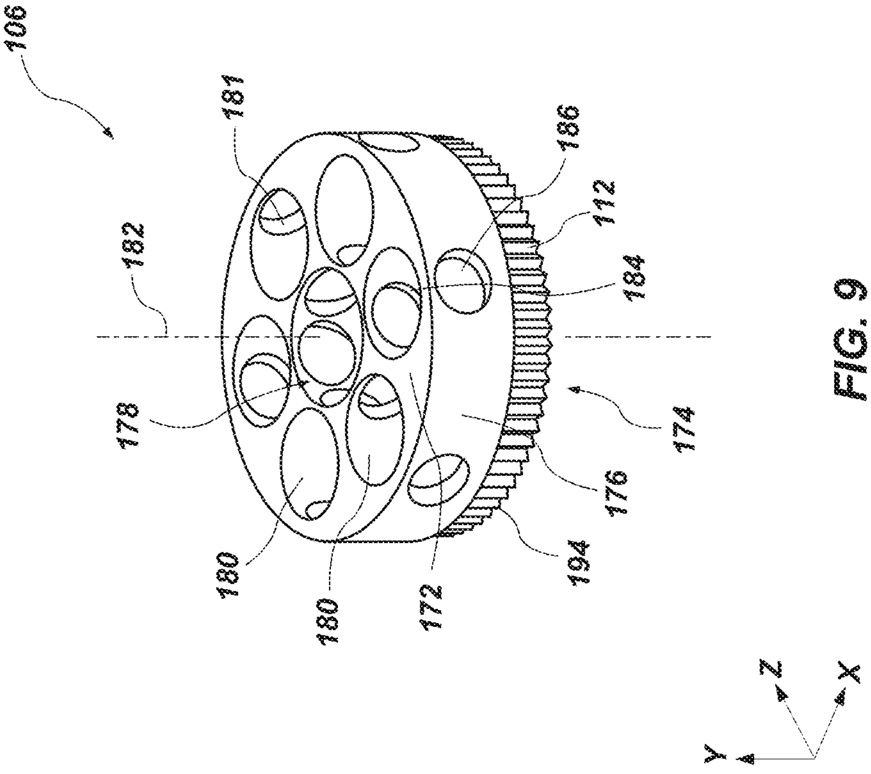
FIG. 9 is a perspective view of additional embodiments of the liner of FIG. 1.

Referring to FIGS. 9-10, the liner 106 may include a first face 172 and a second face 174 opposite the first face 172. An outer wall 176 may extend from the first face 172 to the second face 174. The liner 106 may include a central opening 178. The central opening 178 may be configured to at least partially receive the shaft 150 (FIGS. 6-8). The diameter of the central opening 178 may be substantially the same as the diameter of the shaft 150 (FIGS. 6-8) such that when the housing assembly 100 (FIGS. 1 and 2) is in a fully assembled state, the central opening 178 and the shaft 150 (FIGS. 6-8) may create a fluid tight seal. The liner 106 may include a plurality of sample chambers 180. The sample chambers 180 may be configured to receive a sample to be tested during an ablation cycle. In some embodiments there are at least two sample chambers 180. As shown in FIGS. 9 and 10, the liner 106 includes six sample chambers 180. The sample chambers 180 may be evenly (e.g., uniformly) and circumferentially spaced around an axis 182 (e.g., even angular spacing about a central axis 182). The sample chambers 180 may also be configured to lie in substantially the same plane in the X-Z direction.

FIGS. 9-10 show the liner 106 including six sample chambers 180, however, there may be any suitable number of sample chambers, more or less than six, configured in the liner 106 and the embodiments of the liner 106 are not limited to six sample chambers. The liner 106 may include any number of the sample chambers 180 for holding various experiment controls or samples to be tested. For example, the liner 106 may include between about one sample chamber 180 and about ten sample chambers, such as between about two sample chambers and about six sample chambers.

Figure 12:
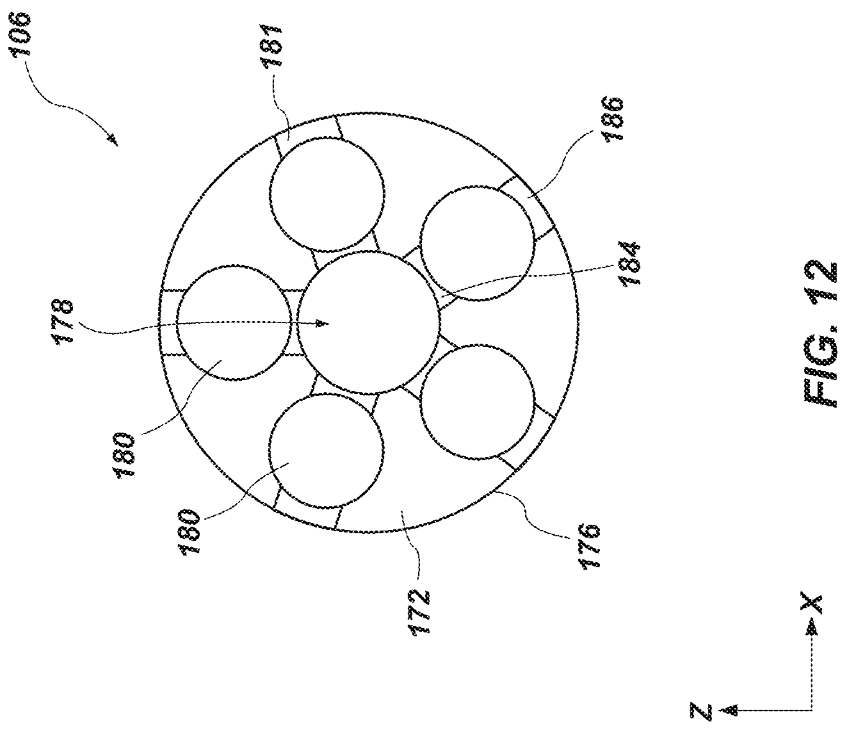
FIG. 12 is a top, cross sectional view of the liner of FIG. 11.
Figure 11:
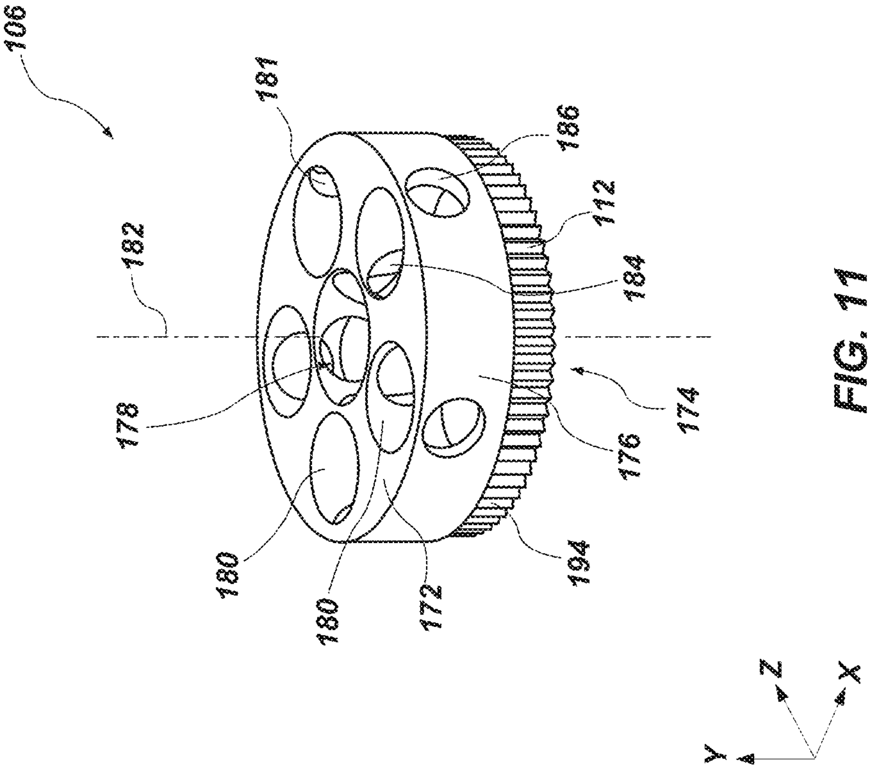
FIG. 11 is a perspective view of other embodiments of the liner of FIG. 1.
Figure 14:
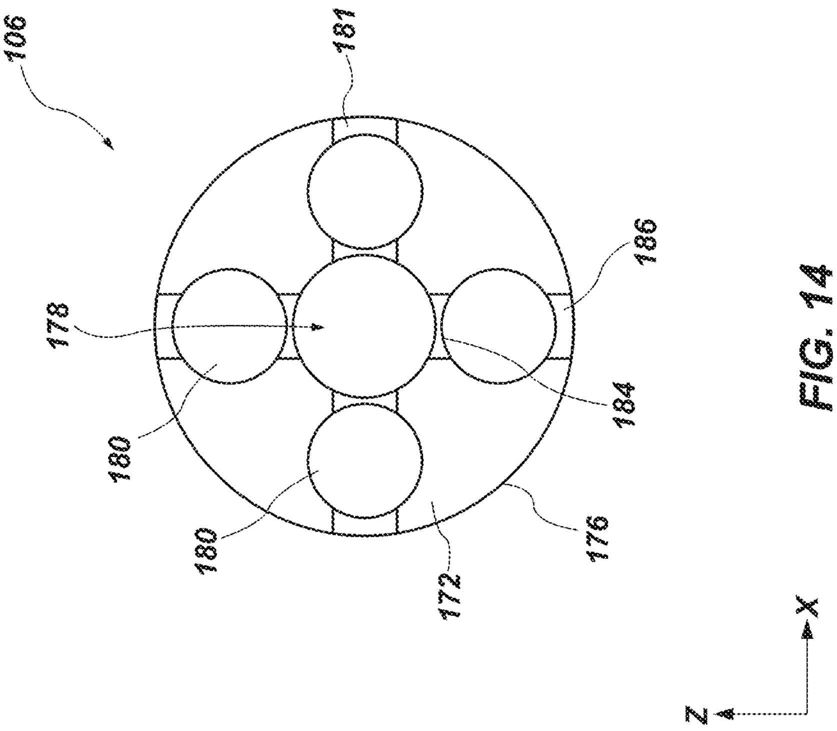
FIG. 14 is a top, cross sectional view of the liner of FIG. 13.
Figure 13:
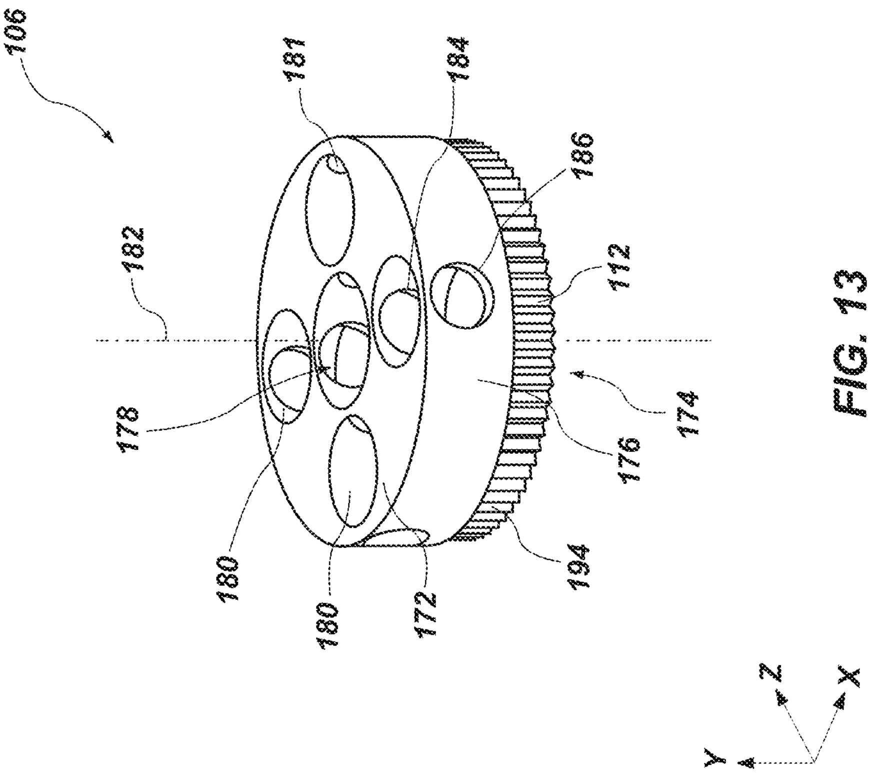
FIG. 13 is a perspective view of yet other embodiments of the liner of FIG. 1.
Figure 16:
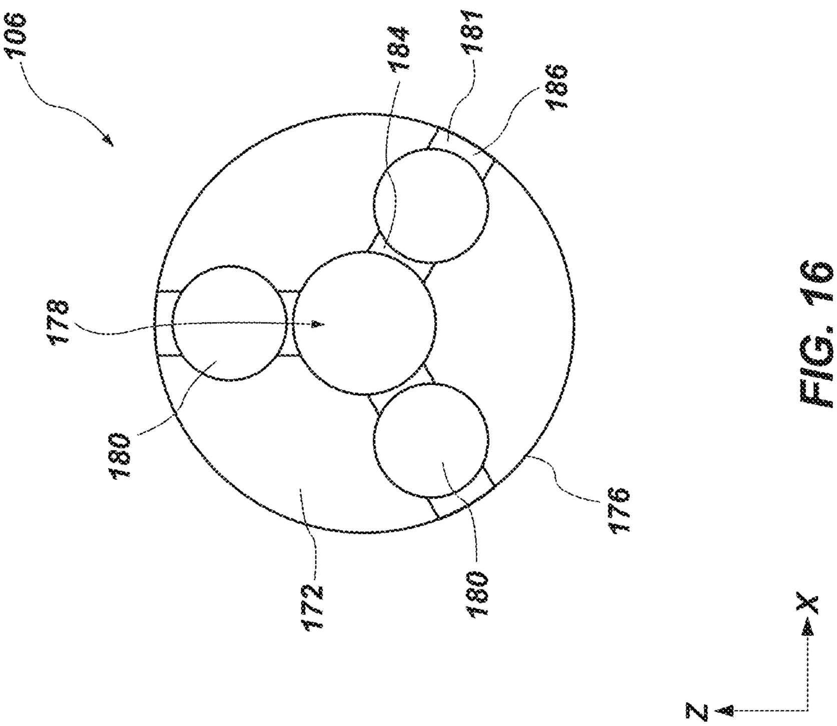
FIG. 16 is a top, cross sectional view of the liner of FIG. 15.
Figure 15:
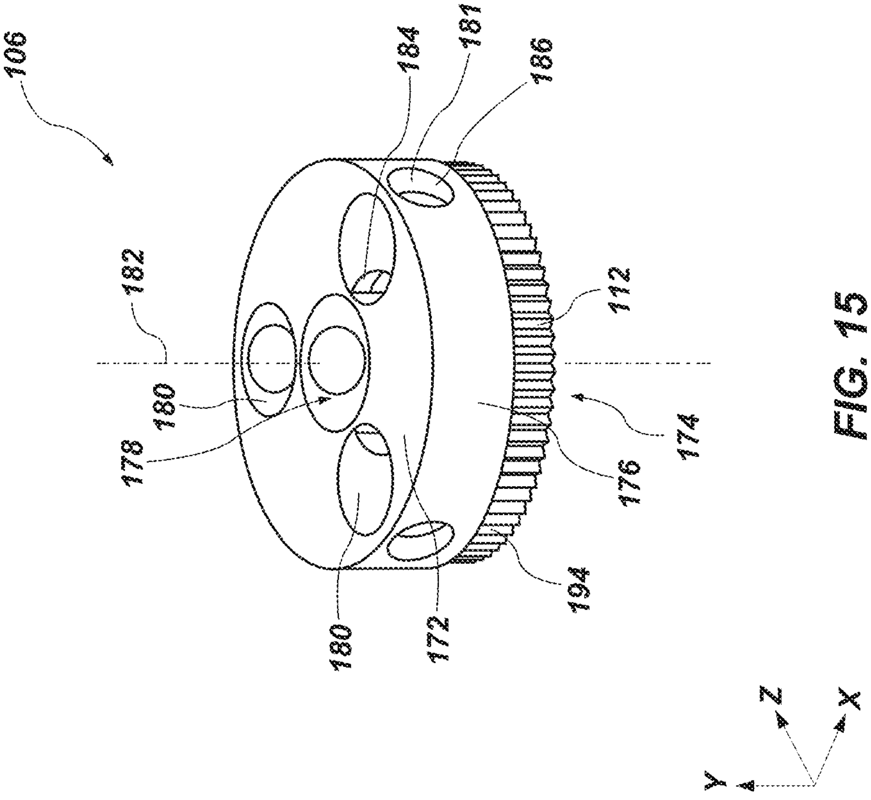
FIG. 15 is a perspective view of further embodiments of the liner of FIG. 1.
Figure 18:
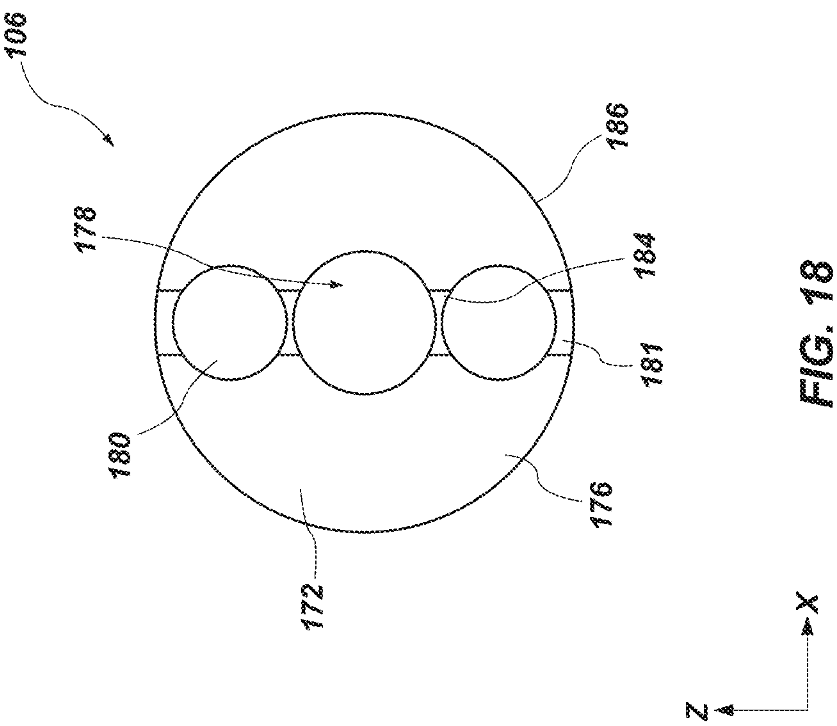
FIG. 18 is a top, cross sectional view of the liner of FIG. 17.
Figure 17:
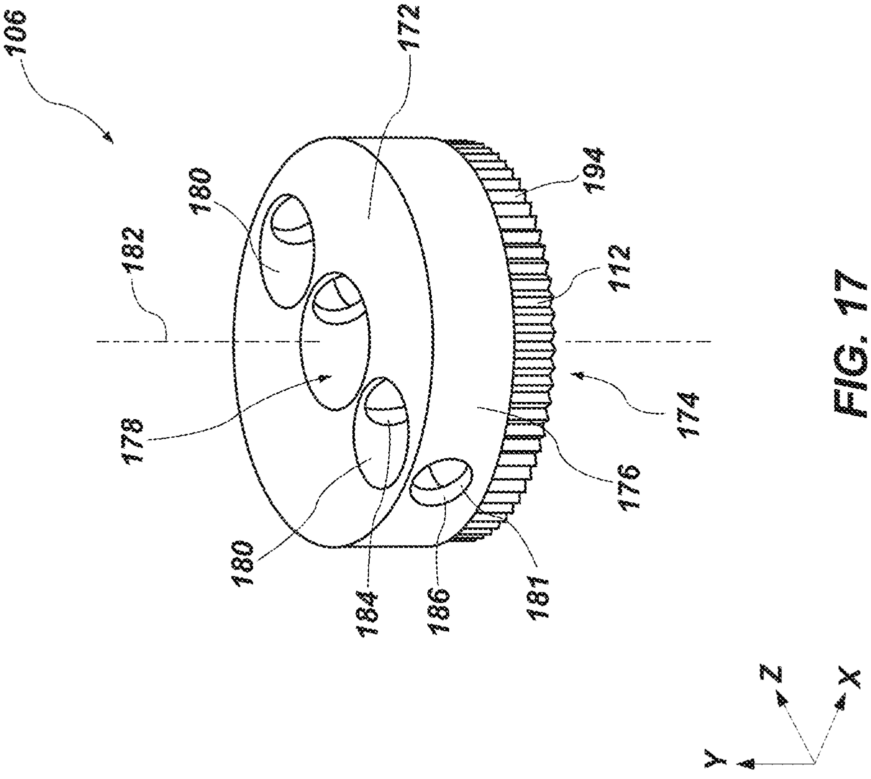
FIG. 17 is a perspective view of additional embodiments of the liner of FIG. 1.

FIGS. 11-18, illustrate additional embodiments of the liner 106, which include different numbers of sample chambers 180. For example, FIGS. 11 and 12 show the liner 106 having five sample chambers 180. The five sample chambers may be evenly and angularly spaced around the axis 182. The sample chambers 180 may also be configured to lie in substantially the same plane in the X-Z direction. FIGS. 13 and 14 show the liner 106 having four sample chambers 180. The four sample chambers 180 may be evenly and angularly spaced around the axis 182. The sample chambers 180 may also be configured to lie in substantially the same plane in the X-Z direction. FIGS. 15 and 16 show the liner 106 having three sample chambers 180. The three sample chambers 180 may be evenly and angularly spaced around the axis 182. The sample chambers 180 may also be configured to lie in substantially the same plane in the X-Z direction. FIGS. 17 and 18 show the liner 106 having two sample chambers 180. The two sample chambers may be evenly and circumferentially spaced around the axis 182. The sample chambers 180 may also be configured to lie in substantially the same plane in the X-Z direction.

Each sample chamber 180 may include an inlet 184 and an outlet 186. The inlet 184 and the outlet 186 may be on substantially opposite sides of the sample chamber 180. Additionally, the sample chamber 180 having the inlet 184, and the outlet 186 may define a fluid passageway through the liner 106. Each sample chamber 180 in the liner 106 may define a fluid passageway in a radial direction through the liner 106, such that the liner 106 may include a same number of fluid passageways extending through the liner 106 as there are sample chambers 180 defined in the liner 106. Each fluid passageway may be radially aligned with the respective sample chamber 180.

When the housing assembly 100 (FIG. 2) is in a fully assembled state, the liner 106 may be configured to rotate freely about the shaft 150 (FIGS. 6-8). When the liner is in a static state (i.e., not rotating about the shaft 150), the sample chambers 180 may be positioned in a testing state or a passive state. The testing state may be defined when the fluid passageway 181 of the sample chamber 180 is substantially aligned with the fluid passageway 160 of the support structure 104 (FIG. 2) and the fluid passageway 117 of the chamber 102 (FIG. 2). For example, in the testing state the sample chamber 180 may be positioned between the outlet 158 (FIGS. 6-8) of the support structure 104 (FIG. 2) and the outlet 144 (FIG. 5) defined in the chamber 102 (FIG. 2). The passive state may be defined when the fluid passageway of the sample chamber 180 is not aligned with the fluid passageway of the support structure 104 (FIG. 2) and the chamber 102 (FIG. 2). The testing state may include the sample chamber 180 where an active laser ablation test may occur, and the passive state may include any sample chamber 180 where an active laser ablation test may not occur.

The liner 106 is configured to be able to rotate relative to the shaft 150 such that during a full testing cycle, each sample chamber 180 may be positioned in the testing state for at least a portion of the full testing cycle. During a full testing cycle, the sample chamber 180 may remain in the testing state for any desired period of time. In some embodiments, the sample chamber 180 may remain in the testing state for a time within a range of about 30 seconds to about 15 minutes. In other embodiments, the sample chamber 180 may remain in the testing state for a time within a range of about 10 seconds to about 60 minutes. During the full testing cycle, each sample chamber 180 may be tested for any prescribed period of time.

Figure 22:
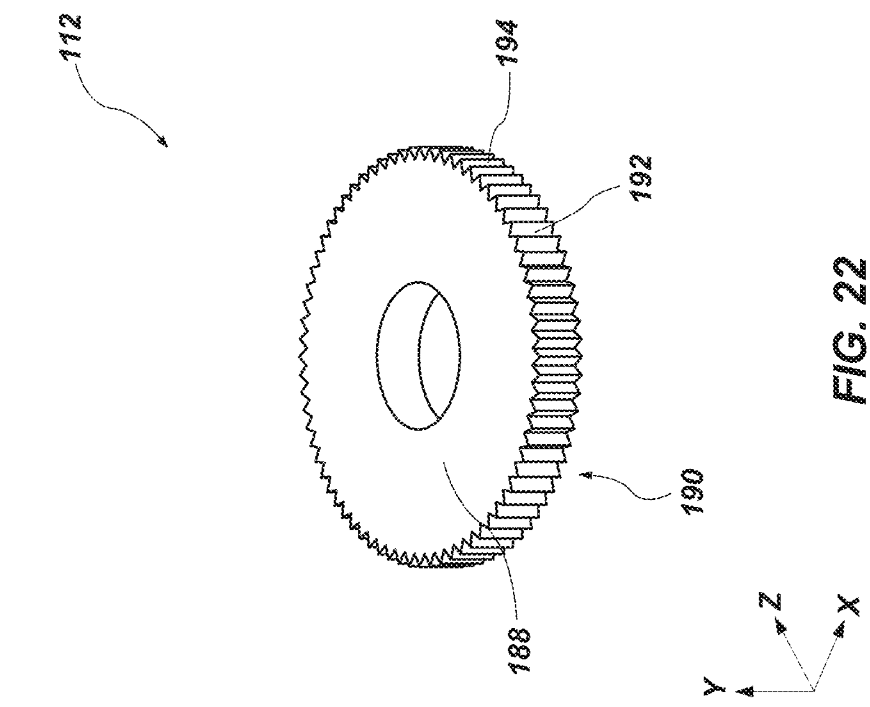
FIG. 22 is a perspective view of the gear of the housing assembly of FIG. 1.
Figure 21:
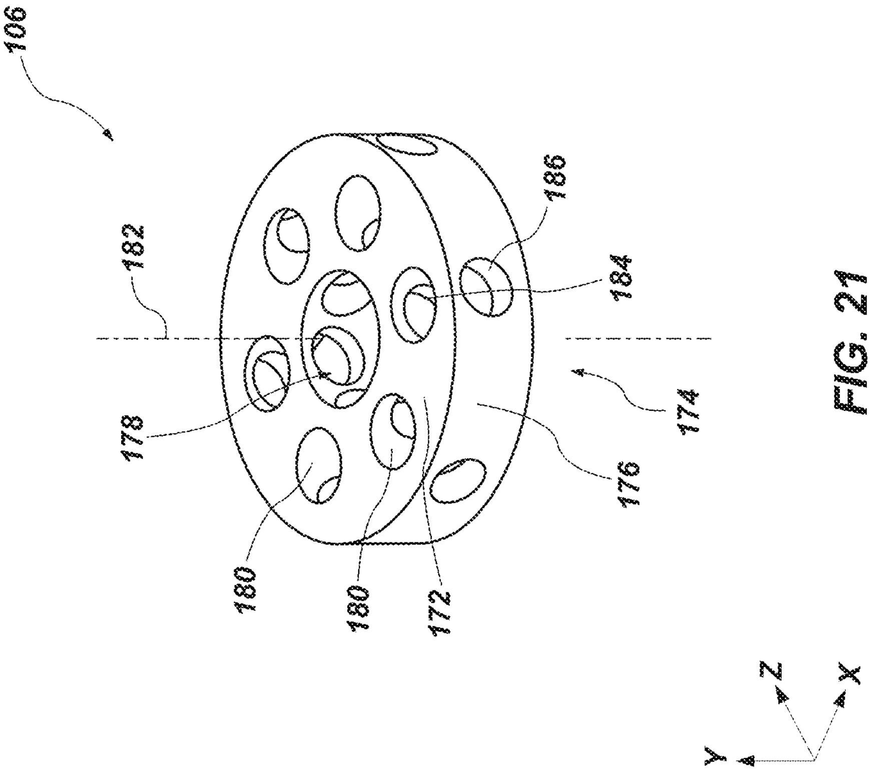
FIG. 21 is a perspective view of embodiments of the liner configured to be used in the housing assembly of FIG. 1.

The housing assembly 100 (FIGS. 1 and 2) is configured to facilitate the liner 106 rotating during the full testing cycle such that each sample chamber 180 may be positioned in the testing state sequentially. In some embodiments, the gear 112 may be a separate body from the liner 106, as shown in FIGS. 21 and 22, and may be permanently or temporarily fixed relative to the liner 106 when the housing assembly 100 is in a fully assembled state. The gear 112 may be fixed relative to the liner 106 by hardware connectors such as bolts or screws, adhesives such as epoxy, welding, soldering, etc. The gear 112 may be configured to facilitate the rotation of the liner 106 relative to the shaft 150 (FIGS. 6-8). The gear 112 may include a first face 188, a second face 190 opposite the first face 188 and a radially outer surface 192 extending from the first face 188 to the second face. In some embodiments, the gear 112 may be one (e.g., a single) continuous piece of the liner 106, as shown in FIGS. 9-17, and thus the first face 188 may not exist. The radially outer surface 192 may be contiguous with the outer wall 176 of the liner. The radially outer surface 192 may have a smaller outer diameter than the outer wall 176. The gear may include teeth 194 which may be located on the radially outer surface 192 of the gear 112. The outer diameter of the radially outer surface 192 may be configured such that an outer diameter of the teeth 194 may be substantially the same as the outer diameter of the outer wall 176. Additionally, the teeth 194 may be configured to interact with teeth 195 on a portion of the motor 197 (FIG. 2). The motor 197 (FIG. 2) may provide a power source for the housing assembly to rotate the liner 106 relative to the shaft 150 (FIGS. 6-8) so each sample chamber 180 may be tested. The motor 197 (FIG. 2) may be configured (such as through a controller) to have preset patterns for rotating the liner 106 based on how many sample chambers 180 are present in the liner 106. The pattern for rotating the liner 106 may also be adjustable based on the material being tested or for any other desired reason during a full testing cycle. The full testing cycle may be fully automated or may be manipulated by a controller during the cycle runtime.

The liner 106 may include any suitable material such as one or more metals (e.g., stainless steel, titanium, aluminum, metal alloys, etc.), glass (e.g., soda-lime, borosilicate, fiberglass, aluminosilicate, non-silicate, etc.), ceramics (e.g., quartz, aluminum oxide, clay, porcelain, etc.), and/or composites (e.g., metal matrix composites, ceramic matrix composites, etc.). The liner 106 may be a material that is inexpensive and easy to machine through conventional methods. In some embodiments, the liner 106 is selected from a material having low absorption characteristics (e.g., a material that absorbs minimal radiation), such as aluminum. A material having low absorption characteristics may result in an easily disposable material (e.g., a material that can be disposed of in a conventional manner without the special handling required for different classes of hazardous waste), such as after being exposed to radiation.

Figure 19:
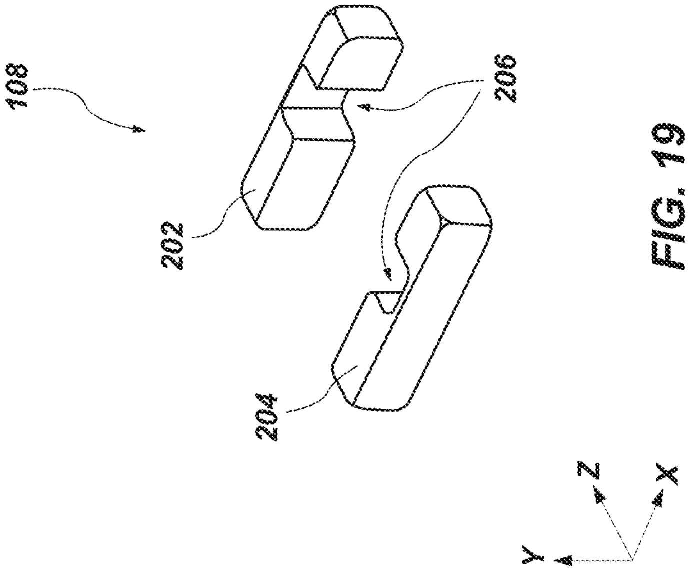
FIG. 19 is a perspective view of the tray of FIG. 1.

Referring to FIGS. 2, 3 and 19, the tray 108 is configured to at least partially receive the motor 197 and facilitate positioning the motor 197 within the chamber 102. The tray 108 may also facilitate easier assembly and disassembly of the housing assembly 100. The tray 108 may include a first body 202 and a second body 204. The first body 202 and second body 204 may be configured to secure the motor 197 relative to the chamber 102 when the housing assembly 100 is in a fully assembled state. Each of the first body 202 and the second body 204 may include a recess 206. The recesses 206 are configured to partially receive the motor 197 and secure the motor 197 in the X direction and the Z direction. In some embodiments, the first body 202 and the second body 204 may appear to be mirrored about the X-Y plane. In other embodiments, the first body 202 and the second body 204 may not appear to be mirrored about any plane. The first body 202 and the second body 204 may be configured to be received in the lower portion 145 of the opening 140. As illustrated in FIG. 19, the first body 202 and the second body 204 are separate components. The lower portion 145 of the opening 140 may be sized and shaped to secure the first body 202 and the second body 204 relative to one another in both a Y-direction and a Z-direction. In other embodiments, the first body 202 and the second body 204 may be connected as one body configured to be disposed into the lower portion 145 of the opening 140. The motor 197 may be configured to be at least partially positioned within the tray 108 or the tray 108 may be at least partially configured to fit around the motor 197. The tray 108 and the motor 197 may be at least partially received by the chamber 102 through the second opening 140. The second opening 140 is configured such that when the motor 197, with the tray 108 at least partially receiving or surrounding the motor 197, is inserted into the second opening 140, mechanical interference may prevent the motor 197 from moving in any lateral or vertical direction relative to the chamber 102. When the housing assembly is in a fully assembled state, the motor 197 may be configured to interface with the gear 112 to rotate the liner 106 relative to the chamber 102. The geometry of the tray 108 may be defined by any suitable shape that is complementary to the geometry of the second opening 140 such that, when the housing assembly 100 is in a fully assembled state, the motor 197 may be fixed relative to the chamber 102 during the full testing cycle.

The tray 108 may include any suitable material such as one or more metals (e.g., stainless steel, titanium, aluminum, metal alloys, etc.), glasses (e.g., soda-lime, borosilicate, fiberglass, aluminosilicate, non-silicate, etc.), ceramics (e.g., quartz, aluminum oxide, clay, porcelain, etc.), and/or composites (e.g., metal matrix composites, ceramic matrix composites, etc.).

Figure 20:
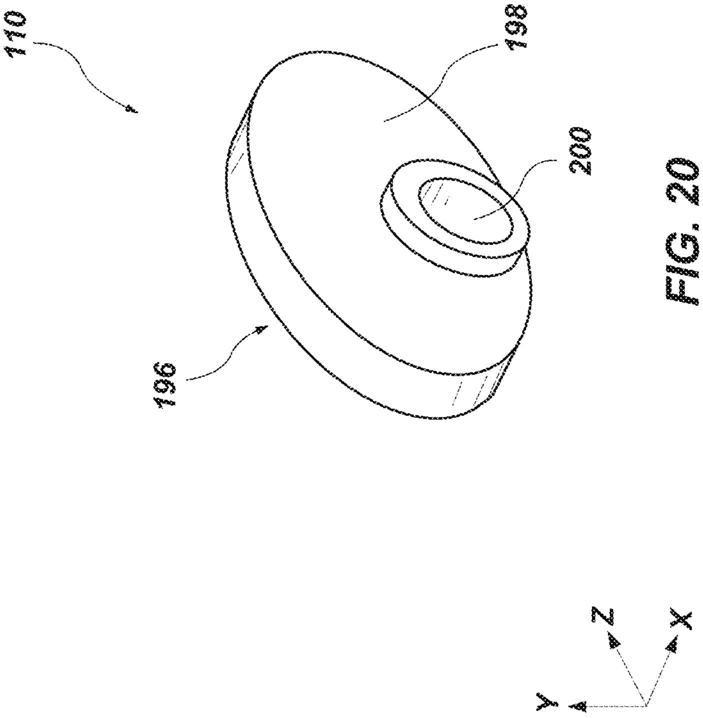
FIG. 20 is a perspective view of the tray cover of FIG. 1.

Referring to FIGS. 3 and 20, the tray cover 110 may be configured to substantially cover the second opening 140. The tray cover 110 may include a first face 196 and a second face 198. The geometry of the first face 196 may be configured to be substantially complementary to the geometry of the first surface 142 of the second opening 140. The tray cover 110 may be configured to partially be received within the second opening 140. The second face 198 of the tray cover 110 may, for example, be welded to the outer side surface 120 of the chamber 102. The interface between the tray cover 110 and the chamber 102 may create a substantially leak tight connection preventing any residual byproduct from any portion of the testing cycle from exiting the chamber 102. The tray cover 110 may include a threaded opening 200. The threaded opening 200 may be configured to facilitate a power supply for the motor 197 passing through the tray cover 110 and into the chamber 102. The threaded opening 200 may also be configured to receive a threaded seal. The threaded seal may provide a substantially leak tight seal between itself and the tray cover 110 and may provide a substantially leak tight aperture for a power supply to pass through.

The tray cover 110 may include any suitable material such as one or more metals (e.g., stainless steel, titanium, aluminum, metal alloys, etc.), glasses (e.g., soda-lime, borosilicate, fiberglass, aluminosilicate, non-silicate, etc.), ceramics (e.g., quartz, aluminum oxide, clay, porcelain, etc.), and/or composites (e.g., metal matrix composites, ceramic matrix composites, etc.).

In some embodiments, the substance to be analyzed within the housing assembly 100 may include nuclear fuel samples and other control samples. The substance to be analyzed may be any substance for which laser ablation is appropriate. Analyzing a substance may include several acts. In some embodiments, for example, the substance or substances to be analyzed are placed into one or more of the sample chambers 180 of the liner 106. The substance to be analyzed may be placed directly into the sample chambers 180 or may be provided in packaging to a container that may fit into the sample chamber 180. The substance to be analyzed in each sample chamber 180 may be the same substance or each sample chamber 180 may have a different substance. The support structure 104 and the liner 106 are placed within the central cavity 114 of the chamber 102. In some embodiments where the gear 112 is separate from the liner 106, the gear 112 is also placed within the central cavity 114. After the support structure 104 and the liner 106 are placed within the central cavity 114, the cover 132 is secured to the chamber 102 over the central cavity 114. The cover 132 may be configured to form a seal with the chamber 102. In some embodiments, a gasket 134 is disposed between the cover 132 and the chamber 102 to facilitate a hermetic seal therebetween. The motor 197 and the tray 108 are configured to be inserted into the second opening 140. The tray cover 110 may then be secured over the second opening 140. In some embodiments, the tray cover 110 is configured to form a hermetic seal with at least one of the first surface 142 and the second surface 143.

When the housing assembly 100 is in a fully assembled state, as shown in FIG. 2, the chamber 102 may be connected to a fluid source (not shown) at the inlet 118. The outlet 144 may be connected to a fluid recycling system, a waste or disposal system, or any other desired system to collect the fluid after an analysis is performed. The inlet 118 is configured to receive a fluid, such as a gas or a liquid from the source and deliver it through the fluid passageway 117 of the chamber 102. The fluid is then received in the fluid passageway 160 of the support structure 104. The fluid passageway 160 of the support structure transfers the fluid into the liner 106. As described above with reference to FIGS. 11-18, the liner 106 may rotate relative to the support structure 104 and the chamber 102 and may be in the testing state or the passive state depending on the relative position of the liner 106. When the liner 106 is in the testing state, the fluid passageway 181 of the sample chamber 180 receives the fluid from fluid passageway 160 of the support structure 104 and transfers the fluid into the sample chamber 180. Analysis of the substance is performed and the fluid may then exit the liner 106 and exit the chamber 102 through the outlet 144. The analysis may be conducted by conventional techniques, which are selected depending on the substance to be detected. After analysis of one sample chamber 180, the liner 106 may be rotated to the next sample chamber 180 until analysis of each substance has been performed. After analysis of one or more substances has been performed, the cover 132 may be removed and the liner 106 may be disposed of and/or replaced for another cycle of substance analysis.

The embodiments of the disclosure present several advantages in comparison to conventional ablation devices. These embodiments facilitate multi-sample analysis without cross contaminating the sample chambers 180 or requiring a new sample chamber 180 after each analysis. The liner 106 according to embodiments of the disclosure is configured with built-in radiation shielding and the assembled components of the housing assembly 100 provide significantly reduced free volume space relative to conventional assemblies, allowing for rapid washout times and increased mapping speed for samples. Multi-sample testing decreases the total time it takes to test multiple samples up to three times or more when compared to conventional methods. Additionally, these embodiments facilitate reuse of each chamber 102 used. The liners 106 are configured to be disposed of after each testing cycle, reducing the costs of running each test and reducing costs of material for each test. Disposing of the liners 106 while re-using the chamber 102 creates less total waste than using conventional methods. Furthermore, the liners 106 may be formed from materials with low absorption characteristics that can be disposed of through conventional methods without requiring expensive hazardous material handling, which may further reduce the costs of each test. Being able to calibrate and perform the analyses without opening the chamber 102 facilitates higher throughput and overall data quality as the conditions in the chamber 102 may be the same for both standard and sample. These embodiments also provide a leak-tight system which enhances the safety of both the worker and immediate environment during analysis of radioactive materials, including powders or metal fines.

The embodiments of the disclosure described above and illustrated in the accompanying drawing figures do not limit the scope of the disclosure, since these embodiments are merely examples of embodiments of the invention, which is defined by the appended claims and their legal equivalents. Any equivalent embodiments are intended to be within the scope of this disclosure. Indeed, various modifications of the disclosure, in addition to those shown and described herein, such as alternative useful combinations of the elements described, will become apparent to those of ordinary skill in the art from the description. Such modifications and embodiments also fall within the scope of the appended claims and their legal equivalents.

What is claimed is:

1. An ablation chamber assembly, comprising:
- a chamber defining a fluid inlet, a central cavity, and a fluid outlet;
- a support structure disposed in the central cavity, the support structure including a support flange and a fluid passageway defined through the support structure; and
- a liner disposed in the chamber over the support flange of the support structure, the liner including:
  - a central opening;

- one or more sample chambers spaced about the central opening, the one or more sample chambers configured to receive testing samples,
- wherein the fluid passageway is configured to direct a fluid from the fluid inlet into one sample chamber of the one or more sample chambers through the central opening of the liner and out the fluid outlet.

2. The ablation chamber assembly of claim 1, wherein the liner includes at least two sample chambers angularly spaced about the central opening.

3. The ablation chamber assembly of claim 1, wherein the liner is configured to rotate relative to the chamber and the support structure.

4. The ablation chamber assembly of claim 3, wherein the liner is configured to rotate to align a second sample chamber of the at least two sample chambers between the fluid passageway and the fluid outlet, such that the fluid passageway is configured to direct the fluid into the second sample chamber and out the fluid outlet.

5. The ablation chamber assembly of claim 1, wherein the ablation chamber assembly further comprises a tray disposed in the chamber, the tray configured to hold and secure a motor in the chamber.

6. The ablation chamber assembly of claim 5, wherein an opening in an outer wall of the chamber is configured to receive the tray and the motor.

7. The ablation chamber assembly of claim 1, wherein the liner is formed from a material having low absorption characteristics.

8. The ablation chamber assembly of claim 7, wherein the liner comprises aluminum.

9. The ablation chamber assembly of claim 1, further comprising a cover over an opening of the central cavity.

10. The ablation chamber assembly of claim 9, wherein the cover is configured to create a seal with the chamber at the opening.

11. The ablation chamber assembly of claim 10, further comprising a gasket between the cover and the chamber.

12. A liner for an ablation device, comprising:
- a central opening;
- one or more sample chambers angularly spaced about the central opening, the one or more sample chambers each configured to receive testing samples;
- an inlet defining a fluid passageway between the central opening and each of the one or more sample chambers; and
- an outlet defining a fluid passageway between each of the one or more sample chambers and an outer surface of the liner.

13. The liner of claim 12, further comprising a gear coupled to the liner, the gear configured to interface with a drive gear to rotate the liner.

14. The liner of claim 13, wherein the gear is formed contiguously with the liner.

15. The liner of claim 12, wherein the liner includes between two chambers and six chambers.

16. The liner of claim 12, wherein the liner is disposable after one testing cycle.

17. A method of analyzing a fuel sample, comprising:
- receiving a liner within a central cavity of a chamber, the liner having at least two sample chambers, each sample chamber including a substance to be analyzed;
- rotating the liner until a first sample chamber of the at least two sample chambers is in a testing position;
- performing at least one analysis of the substance to be analyzed in the testing position;

rotating the liner until a second sample chamber of the at least two sample chambers is in the testing position; and performing at least one analysis of the substance to be analyzed in the second sample chamber in the testing position.

18. The method of claim 17, further comprising disposing of the liner after at least one analysis of one or more substances in the at least two sample chambers has been completed.

19. The method of claim 17, wherein performing at least one analysis of the substance to be analyzed comprises performing an analysis of all of the at least two sample chambers.

20. The method of claim 17, wherein performing at least one analysis of the substance to be analyzed comprises:

passing a fluid through an inlet of a chamber configured to receive the liner;

passing the fluid into a support structure and through a fluid passageway of the support structure into a fluid passageway of the liner; and passing the fluid from the fluid passageway of the liner through an outlet of the chamber.

* * * * *